(12) United States Patent
Nakamura

(10) Patent No.: US 6,532,499 B1
(45) Date of Patent: Mar. 11, 2003

(54) METHOD FOR SWITCHING A PLURALITY OF KEY FUNCTIONS ALLOCATED TO A SPECIAL KEY

(75) Inventor: Tetsuji Nakamura, Yokohama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/526,670

(22) Filed: Mar. 15, 2000

(30) Foreign Application Priority Data

Mar. 17, 1999 (JP) ............................................. 11-072284

(51) Int. Cl.[7] ................................................. G06F 3/00
(52) U.S. Cl. ................................. 710/1; 710/5; 710/64; 712/225; 341/26
(58) Field of Search ............................. 710/1, 2, 5, 36, 710/38, 62, 63, 64, 65; 712/28, 225; 334/26, 22

(56) References Cited

U.S. PATENT DOCUMENTS

| | | | | |
|---|---|---|---|---|
| 4,644,497 A | * | 2/1987 | Tajima et al. ................. | 364/900 |
| 5,173,940 A | * | 12/1992 | Lantz et al. ................... | 380/25 |
| 5,539,400 A | * | 7/1996 | Mears .......................... | 341/22 |
| 5,659,308 A | * | 8/1997 | Goff ............................. | 341/26 |
| 5,878,276 A | * | 3/1999 | Aebli et al. ................... | 710/19 |
| 5,999,996 A | * | 12/1999 | Dunn ........................... | 710/64 |
| 6,181,262 B1 | * | 1/2001 | Bennett ........................ | 341/26 |
| 6,278,384 B1 | * | 8/2001 | Ide ............................... | 341/26 |

* cited by examiner

Primary Examiner—Jeffrey Gaffin
Assistant Examiner—Rijue Mai
(74) Attorney, Agent, or Firm—David M. Shofi; Anne Vachon Dougherty (57) ABSTRACT

A method for switching among a plurality of key functions allocated to a special key, whereby the occurrence of a phenomenon that is contrary to a user's intent can be prevented. When a key event detector 14 detects the depression of a special key, it sets a register 18 by which a request is asserted to output a make scan code that is supposed to be output when the special key is independently depressed and that is originally allocated for the special key. A key event analyzer 15 and a code generator 16 output a scan code to carry out a predetermined key function in response to the depression of a key. But if the register 18 is set when the special key is released, the key event analyzer 15 and the code generator 16 output the above described make scan code.

16 Claims, 6 Drawing Sheets

METHOD FOR SWITCHING A PLURALITY OF KEY FUNCTIONS ALLOCATED TO A SPECIAL KEY

FIELD OF THE INVENTION

The present invention relates generally to interpreting input to a computer keyboard and more particularly to a method for switching among a plurality of key functions allocated to a special key.

BACKGROUND OF THE INVENTION

Windows 95/98 (Trademark), which is an operating system (OS) for personal computers (PCs), supports a special key, such as an "Application" key and a "Windows" key (both of which are hereinafter referred to as "OS dependent special keys"). When, for example, the "Windows" key and the "F1" key are depressed at the same time, a function to display a pop-up menu for a selected object is carried out. However, the "Application" key and the "Windows" key can be mounted only on a keyboard (hereinafter referred to as a "PC 95/98 keyboard") that has been licensed by Microsoft Corporation. Therefore, even though Windows 95/98 can be installed on a personal computer (PC) that has a non-PC 95/98 keyboard, there are no OS dependent special keys on the keyboard, so that the services provided for these keys are not available when using a non-licensed keyboard. That is, even though the personal computer is a Windows 95/98 machine, not all the services that are provided by Windows 95/98 are available for use.

To resolve this problem, for a personal computer (PC) that has a non-PC 95/98 keyboard, a special countermeasure must be taken. An example PC that has a non-PC 95/98 keyboard is a ThinkPad (Trademark), a notebook personal computer produced by IBM Corporation and IBM Japan, Co., Ltd. A unique key called the "Fn" key is included on the keyboard of the ThinkPad. When a specific key is depressed together with the "Fn" key, a unique ThinkPad function is carried out. For example, the depression of the "Fn" key+the "F4" key combination carries out a suspend function. Here, "+" is used to represent the state wherein two keys are depressed at the same time. Thus, the expression "A" key+"B" key, which can also be written simply as "A"+"B," is used to indicate that the "B" key is depressed together with the "A" key. The suspend function itself is a process by which the computer is temporarily halted and is placed in the standby state. Another key pair, the "Fn" key+"F7" key combination, is used to carry out switching of a display screen. When a display screen is changed, the current display screen is erased and another screen is displayed.

A key combination such as "Fn" key+"F4" key or "Fn" key+"F7" key is normally called a hotkey. But since no specific definition is available for a hotkey, herein it is defined as follows. First, let us assume that a key for carrying out a specific, individual function is called a "some" key when it and the "Fn" key are depressed together, and that all the keys on a keyboard, other than the "Fn" key, can be assigned and used as "some" keys. From this, we can deduce that a hotkey can be defined as an "Fn" key+"some" key combination. While physically a hotkey comprising an "Fn" key and a "some" key is not a single key, logically an "Fn" key+"some" key combination can be regarded as a single key. Therefore, when the key constituting an "Fn" key+"some" key combination is depressed, a function that has been determined in advance can be carried out. In other words, a "some" key can be considered a hotkey component when the "Fn" key is depressed together with it.

Generally, when a key on a keyboard is depressed or released, one or more data sets are output. Collectively, these data are called scan code. These data, which are output upon the depression of a key, are changed in accordance with the states of special keys, such as the Shift key, the Ctrl key and the Alt key, and also in accordance with the state of the NumLock key. But not all the keys that are physically mounted on a keyboard have a uniquely set inherent scan code. For example, when the NumLock key is set OFF (at this time, an LED (Light Emitting Diode), located in the vicinity of the "NumLock" inscription on the keyboard, is turned off), numeric keys in the key pad portion do not act as numeric keys but as cursor moving keys.

The scan code is used by a system to identify a logical key. Since the "Fn" key is different from the other keys, it does not output an inherent scan code.

In the following description, the term "make scan code" is used for code that is output when a key is depressed, and "break scan code" is used for code that is output when a key is released. The make scan codes and the break scan codes are different terms from the scan codes conceptually, although these are complex. As it is, the make scan codes and the break scan codes represent physical movements, such as the depression and the release of a key, while the scan codes are used by a system to identify logical keys. Therefore, although the "Fn" key does not output scan code, it does output make scan code and break scan code.

What is desirable is a system, for use when Windows 95/98 is installed on a ThinkPad or other personal computer which is a personal computer (PC) for which a non-PC 95/98 keyboard is provided, in which an OS dependent special key can be allocated to the "Fn" key to enjoy service normally available from an OS dependent special key. Specifically, (1) When the "Fn" key is depressed, the make scan code of the OS dependent special key is output; (2) when the "Fn" key is released, the break scan code of the OS dependent special key is output; and (3) when a "some" key is depressed together with the "Fn" key, the combination of these keys functions as a hotkey.

For example, the "Fn" key is set so that upon the depression of this key the make scan code of the "Windows" key is output. Then, when the "F1" key is depressed together with the "Fn" key, the function for the display of a pop-up menu for a selected object is carried out, as it is when the "Windows"+"F1" combination are entered at a PC 95/98 keyboard.

However, in the method by which the "Fn" key is used to provide the OS dependent special key function, a phenomenon that is contrary to a user's intent occurs. That is, when the "Fn" key is used for a hotkey in (3), the break scan code of the OS dependent special key described in (2) is output when the "Fn" key is released following the depression of a "some" key. As a result, a function carried out by a break signaled by the OS dependent special key is carried out, and a phenomenon that is contrary to the user's intent occurs. For example, when the "Application" key is assigned to the "Fn" key, it acts as a shortcut key of "Shift"+"F10" (this function is provided to display a shortcut key menu for a selected object). The shortcut key is a key on a keyboard to which a command selected from a menu displayed on a screen is allocated. And when the "Windows" key is assigned to the "Fn" key, this shortcut key is constituted by "Esc"+"Ctrl" (the function is provided to display a "start menu").

It is, therefore, one object of the present invention to provide a method for switching among a plurality of key functions allocated to a special key, whereby the occurrence of a phenomenon that is contrary to a user's intent can be prevented.

SUMMARY OF THE INVENTION

Among the keys on a keyboard, there is a special key that provides a specific key function only when used together with another key. The present invention relates to a method for switching among a plurality of key functions allocated to this special key.

First, the depression of the special key is detected. Then, in accordance with the detection, a request is asserted to output a make scan code that is originally allocated to the special key. This make scan code is supposed to be output when the special key is independently depressed. When the request is still kept when the special key is released, the above described make scan code is output.

Therefore, according to the present invention, unlike the prior art the make scan code and the break scan code of a key, the function of which is replaced by the special key, are not output. As a result, it is possible to carry out a method, for switching among a plurality of key functions allocated to the special key, whereby the occurrence of a phenomenon that is contrary to the user's intent can be prevented.

BRIEF DESCRIPTION OF THE DRAWINGS

The invention will now be described with specific reference to the appended drawings wherein.

DETAILED DESCRIPTION OF THE PREFERRED EMBODIMENTS

Figure 1:
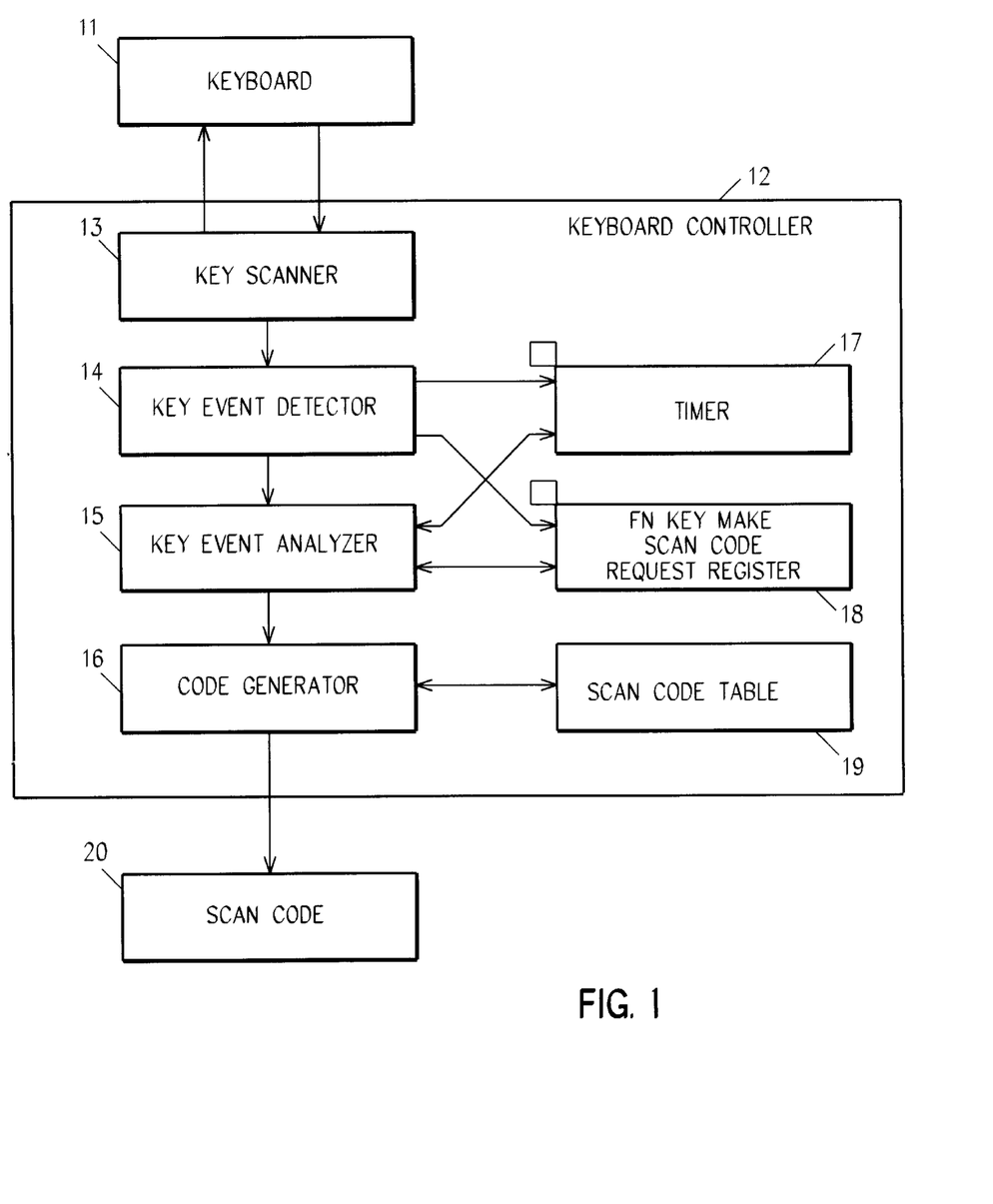
FIG. 1 is a diagram showing a keyboard controller according to one embodiment of the present invention.

One embodiment of the present invention will now be described. FIG. 1 is a diagram showing a keyboard controller according to this embodiment. A keyboard controller 12 essentially comprises: a key scanner 13, a key event detector 14, a key event analyzer 15, a code generator 16, a timer 17, an Fn key make scan code request register 18, and a scan code table 19.

The keyboard controller 12 controls a keyboard 11. A serial number is added to each key at a specific location on the keyboard 11, and an electrical switch is provided under each key. These electrical switches are so arranged as to constitute a matrix. The key scanner 13 electrically scans the matrix, and this electrical scanning is called key scanning. When a specific key is depressed (i.e., make), the key scanner 13 obtains a key event that includes the serial number of the key and the key operation. In this embodiment, the key event includes the serial number and the make operation of the depressed key. When a key is released (i.e., a break), the key scanner 13 also obtains a key event, which includes the serial number and the break operation of the released key. The key event acquired by the key scanner 13 is then transmitted to the key event detector 14.

In this embodiment, a ThinkPad (Trademark), which is a notebook PC, is used. The keyboard 11 is a non-PC 95/98 keyboard that includes the "Fn" key.

In accordance with the key event received from the key scanner 13, the key event detector 14 sets either the timer 17, or the Fn key make scan code request register 18. Then, the key event detector 14 transmits the key event to the key event analyzer 15.

The key event analyzer 15 analyzes the key event received from the key event detector 14, while scanning the timer 17 and the Fn key make scan code request register 18, which are set by the key event detector 14. The key event analysis results are then transmitted to the code generator 16.

In accordance with the key event analysis results received from the key event analyzer 15, the code generator 16 generates scan code 20 and outputs it to a system. The essential components of the system are a BIOS (Basic Input/Output System) and an operating system (OS), including a device driver. In the scan code generation process, the code generator 16 searches the scan code table 19.

Predetermined seconds are set in advance for the timer 17. This preset value can span a time period having a length of from 0 to an infinite number of seconds. When the timer 17 is started by the key event detector 14, it begins a countdown using the preset value and displays the current count value. Then, when the current count value is "0" the timer 17 outputs a time-out. Therefore, when the preset value is 0 seconds, the count value is also "0," so that a time-out occurs upon the depression of a specific key. When the preset value is an infinite number of seconds, however, the count value is not decremented by counting down, and no time-out ever occurs. Normally, the preset value is set to several seconds.

In this embodiment, the function of an OS dependent special key, such as the "Application" key or the "Windows" key, is allocated to the "Fn" key in addition to its inherent key functions. Specifically, the "Fn" key is so set that it carries out the following operations.

(1) When the "Fn" key is depressed, the make scan code of the OS dependent special key is output;

(2) When the "Fn" key is released, the break scan code of the OS dependent special key is output; and (3) When a "some" key is depressed together with the "Fn" key, this key combination functions as a hotkey.

For example, the function of the "Windows" key is allocated to the "Fn" key. When the "F1" key and the "Fn" key are depressed together, the function for the display of a pop-up menu for a selected object is carried out, as it is when "Windows"+"F1" is depressed on a PC 95/98 keyboard.

When the "Fn" key is simply depressed and released, the make scan code and the break scan code, which are allocated to an OS dependent special key, are sequentially output, and the Fn key make scan code request register 18 is used to control the output of the make scan code. That is, when the "Fn" key is released, the Fn key make scan code request register 18 is used to assert the need to output the make scan code originally allocated for the "Fn" key (hereinafter referred to as the "make scan code of the Fn key"), which is output when the "Fn" key is independently depressed, rather than the make scan code allocated for the OS dependent special key.

The scan code table 19 is a table in which the correlation between a key event and a scan code is described. The key event consists of the serial number and the operating state (make or break) of a key. The scan code is one or more data sets that are output when a key on the keyboard is depressed and is released. The scan code is changed in accordance with the states of such special keys as the Shift key, the Ctrl key and the Alt key. Of the keys physically mounted on the keyboard 11, not all of them have inherent scan codes; the "Fn" key, for example, does not have a scan code. The scan codes are used by a system to identify logical keys.

Figure 2:
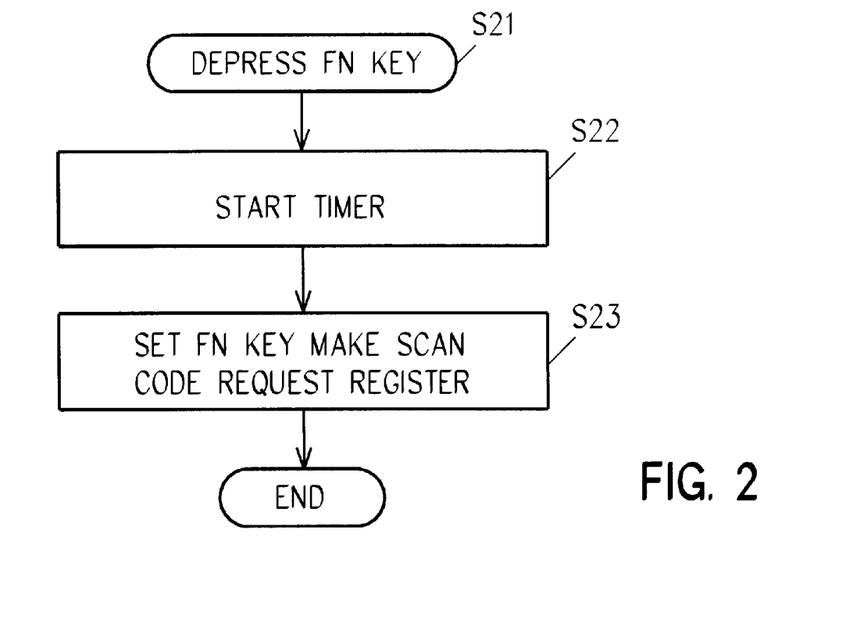
FIG. 2 is a flowchart showing the operation of a key event detector.
Figure 3:
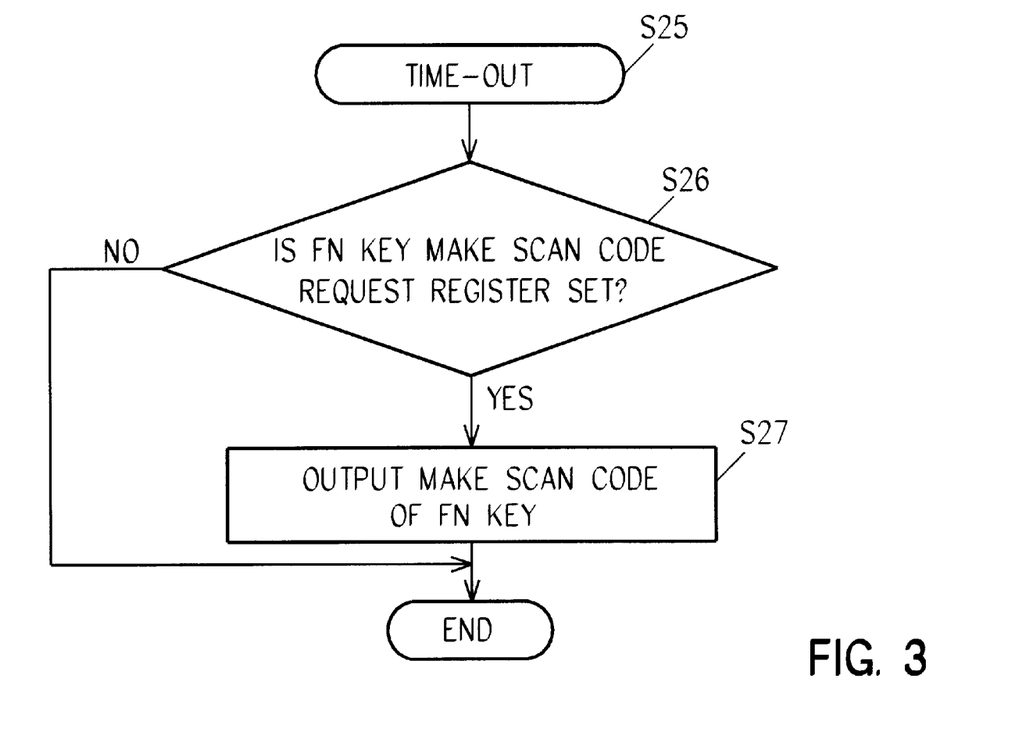
FIG. 3 is a flowchart showing the operations of a key event analyzer and a code generator performed when a timer outputs a time-out.

The operation of the keyboard controller 12 in FIG. 1 will now be described while referring to FIGS. 2 to 5. FIG. 2 is a flowchart showing the operation of the key event detector 14. The operation of the key event detector 14 when the "Fn" key is depressed will be explained while referring to FIG. 2. When the key event detector 14 detects a key event initiated by the depression of the "Fn" key (step S21), it starts the timer 17 (step S22). Then, the Fn key ensures that the make scan code request register 18 is set (step S23). As a result, the timer 17 starts the countdown of the preset value, and the Fn key make scan code request register 18 sets the flag in order to assert the request to output the make scan code of the Fn key.

The operation of the key event detector 14 has been described. Next, the operations of the key event analyzer 15 and the code generator 16 will be explained. While referring to the flowchart in FIG. 3, an explanation will now be given for the operations of the key event analyzer 15 and the code generator 16 that are performed when the timer 17 outputs a time-out. When the key event detector 14 ascertains a time-out has occurred by inspecting the timer 17 (step 325), the key event detector 14 next determines whether the Fn key make scan code request register 18 has been set (step S26). If it has not been set, the process is thereafter terminated. If it has been set, however, program control advances to step S27. At step S27, the key event analyzer 15 requests that the code generator 16 output the make scan code of the Fn key. Upon receiving this request, the code generator 16 searches the scan code table 19, and generates the make scan code of the Fn key and outputs it as scan code 20.

Figure 4:
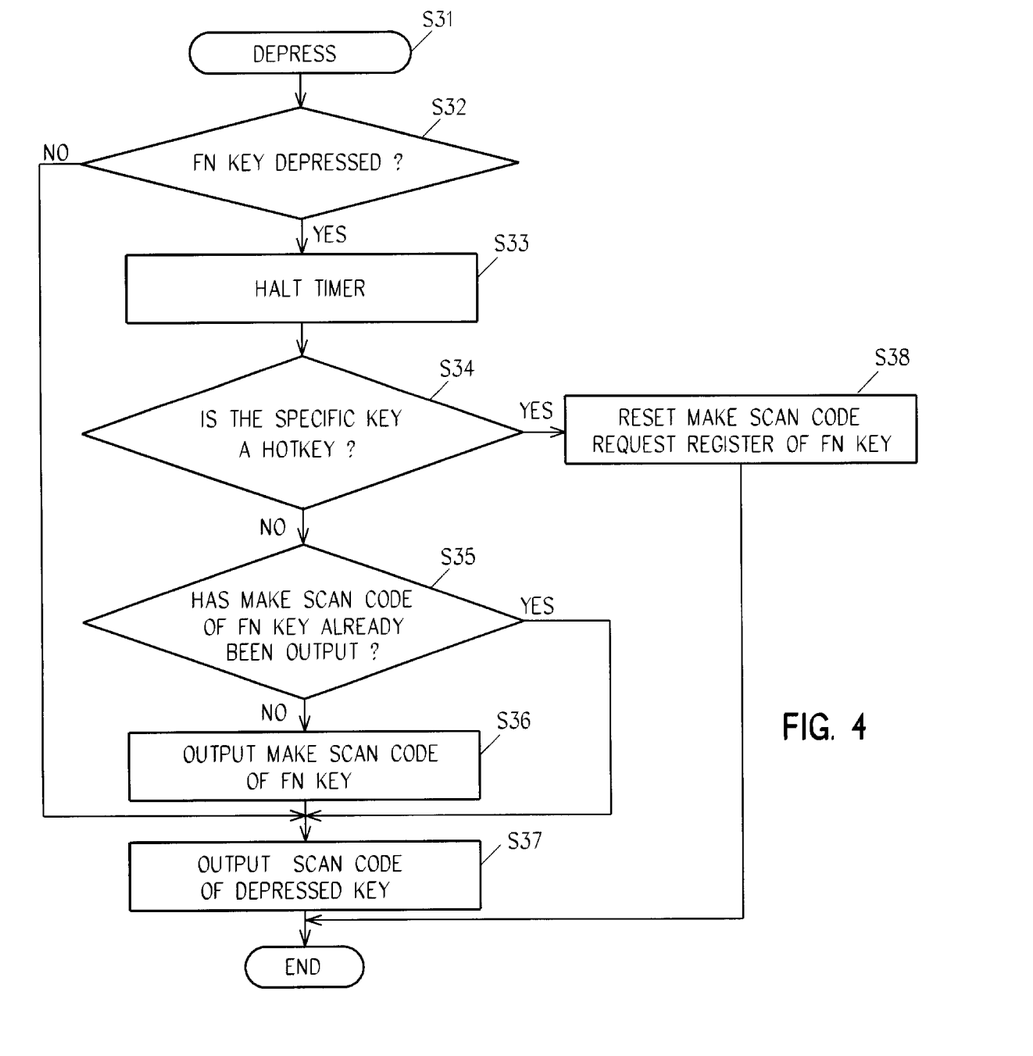
FIG. 4 is a flowchart showing the operations of the key event analyzer and the code generator performed before a time-out occurs.

While referring to the flowchart in FIG. 4, an explanation will now be given for the operations of the key event analyzer 15 and the code generator 16, which are performed upon the depression of a specific key before a time-out has occurred. When the key event analyzer 15 receives a key event to the effect that a specific key has been depressed (step S31), the key event analyzer 15 determines whether the "Fn" key has been depressed (step S32). When the "Fn" key has not been depressed, program control moves to step S37, whereat the event key analyzer 15 begins the process that should be performed when a specific key is independently depressed. When the "Fn" key has been depressed, program control advances to step S33, whereat the timer 17 is halted because it has been confirmed that the "Fn" key has been depressed. As a result, no time-out occurs, and thereafter program control goes to step S34.

At step S34, a check is performed to determine whether the specific key depressed at step S31 is a hotkey. If the key is a hotkey, it means that it has been determined that the "Fn" key is performing a key function as a hotkey. Program control then advances to step S38, whereat the Fn key make scan code request register 18 is reset. The processing is thereafter terminated, and as is described above, since the scan code is not output step S37 is skipped.

When the decision at step S34 is No, it is determined that the "Fn" key is not functioning as a hotkey and program control moves to step S35, whereat a check is performed to determine whether the make scan code of the "Fn" key has been output. If the make scan code has been output, program control advances to step S37. If the make scan code has not yet been output, program control goes to step S36. That is, when the make scan code of the "Fn" key has been output, the internal flag is set; and if this flag has been set, the decision at step S35 is Yes. For example, when a specific key other than a hotkey component is depressed together with the "Fn" key, and when the specific key is released while the "Fn" key is still depressed, the flag is set. Therefore, in this case the decision at step S35 is Yes.

At step S36, the key event analyzer 15 requests that the code generator 16 output the make scan code of the Fn key. Upon receiving this request, the code generator 16 searches the scan code table 19, and generates the make scan code of the Fn key and outputs it as scan code 20.

At step S37, the key event analyzer 15 requests that the code generator 16 output the scan code of the key depressed at step S31. Upon receiving this request, the code generator 16 searches the scan code table 19, and generates the scan code allocated to the pertinent key and outputs it as scan code 20.

Figure 5:
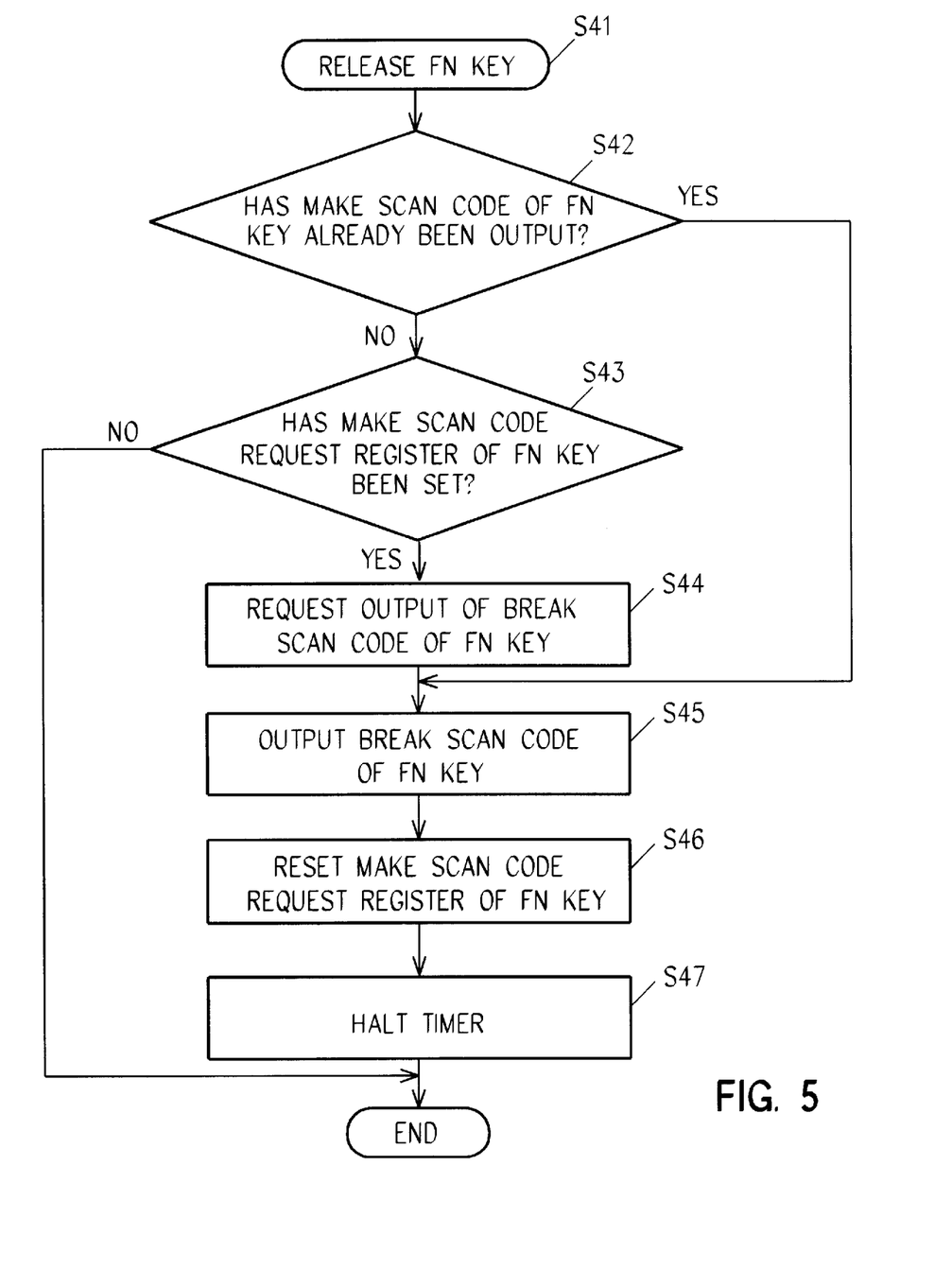
FIG. 5 is a flowchart showing the operations of the key event analyzer and the code generator performed when the "Fn" key is released before a time-out occurs.

While referring to the flowchart in FIG. 5, an explanation will now be given for the operations of the key event analyzer 15 and the code generator 16, which are performed when the "Fn" key is released before a time-out occurs. When the key event analyzer 15 receives a key event to the effect that the "Fn" key has been released (step S41), it determines whether the make scan code of the Fn key has been output (step S42). As is described above, when the make scan code of the Fn key has been output, the internal flag is set. And when a time-out occurs while the "Fn" key is depressed, or when a specific key other than a hotkey component is depressed with the "Fn" key, the make scan code of the Fn key is output. Since in this case the flag is set, the decision at step S42 is "Yes". And when the decision at step S42 is "Yes", program control advances to step S45, whereat the key event analyzer 15 requests the code generator 16 to output the break scan code of the Fn key. Upon receiving this request, the code generator 16 searches the scan code table 19, and generates the break scan code of the Fn key and outputs it as scan code 20. Program control thereafter goes to step S46.

At step S46, the Fn key make scan code request register 18 is reset. Program control then moves to step S47, whereat the timer 17 is halted.

When the decision at step S42 is No (the make scan code of the Fn key has not yet been output), program control moves to step S43. At step S43, a check is performed to determine whether the Fn key make scan code request register 18 has been set. If it has not been set, the processing is thereafter terminated. If it has been set, program control advances to step S44, whereat the key event analyzer 15 requests that the code generator 16 output the make scan code of the Fn key. Upon receiving this request, the code generator 16 searches the scan code table 19, and generates the make scan code of the Fn key and outputs it as scan code 20.

At step S45, as is described above, the key event analyzer 15 requests that the code generator 16 output the break scan code of the Fn key. Upon receiving this request, the code generator 16 searches the scan code table 19, and generates the break scan code of the Fn key and outputs it as scan code 20. Program control then advances to step S46, whereat the Fn key make scan code request register 18 is reset. At step S47, the timer 17 is halted.

While referring to the above described operations of the key event analyzer 15 and the code generator 16, it is understood that the "Fn" key acts as follows:

(1) When a key ("some" key) other than the "Fn" key is depressed together with the "Fn" key, and when the "some" key is a hotkey component, the "Fn" key functions as a hotkey. Thus, the scan code is not output. "Fn" key+"some" key provides, for example, the suspend function. But when "some" key is not a hotkey component, the "Fn" key acts as the OS dependent special key. That is, "Fn" key+"some" key provides the function, for example, of "Windows" key+"some" key.

(2) When the "Fn" key is continuously depressed until the timer 17 outputs a time-out, the "Fn" key acts as an OS dependent special key. Therefore, upon the depression of the "Fn" key, the make scan code is output allocated to the OS dependent special key.

(3) When the "Fn" key is depressed and is then released before conditions (1) and (2) have been satisfied, the "Fn" key acts as an OS dependent special key. Therefore, when the "Fn" key is released, the make scan code and the break scan code allocated to an OS dependent special key are output in the named order.

In the prior art, if the "Fn" key to which the function of an OS dependent special key is allocated is depressed and is then released, and neither a hotkey function or an OS dependent special key function has been carried out, the break scan code of an OS dependent special key is output. As a result, a problem occurs. That is, a phenomenon that is contrary to a user's intent occurs, and an OS dependent special key, such as the "Application" key or the "Windows" key, is released, even though nothing occurs when the key is depressed. For example, the "Application" key functions as a shortcut key for "Shift"+"F10" when it is released. Therefore, when the "Fn" key, to which the OS dependent special key function is allocated, is released, it functions as a shortcut key and causes a phenomenon that the user does not desire, and the function inherent to the "Fn" key can not be obtained.

In this embodiment, when the "Fn" key, to which the OS dependent special key function is allocated, is released, the original make scan code of the "Fn" key is output thereafter. That is, when the "Fn" key is released, it begins to function as the "Fn" key, rather than as an OS dependent special key. Therefore, a problem due to the allocation of an OS dependent special key function to the "Fn" key does not occur.

As is described above, according to this embodiment, the function of an OS dependent special key, such as the "Application" key or the "Windows" key, can be allocated to the "Fn" key without a phenomenon occurring that a user does not desire.

The method described in the above embodiment for switching among a plurality of key functions allocated to a special key can be used by preparing programs using various programming languages (hereinafter this method is called a "key function switching program").

The key function switching program is recorded on a computer-readable recording medium. The recording medium can be a storage device mounted in a computer system, such as a ROM (Read Only Memory), a EEPROM (Electrically Erasable Programmable Read Only Memory), or a flash EEPROM; a portable recording medium, such as a floppy disk (FD), a CD-ROM (a read only memory using a compact disk), or an MO (magneto-optical) disk; or an external storage device provided for a server computer connected to a network.

While referring to FIG. 6, an explanation will now be given for a keyboard controller in which is mounted a recording medium recording a key function switching program. A keyboard controller 52 comprises: a CPU (Central Processing Unit) 53, a ROM (Read Only Memory) 54, a RAM (Random Access Memory) 56, a timer 57, and an interface (I/F) circuit 58, all of which are connected together by an internal bus.

The keyboard controller 52 controls a keyboard 51. The CPU 53 controls the individual components of the keyboard controller 52.

In the ROM 54 a program to be executed by the CPU 53 is stored as a keyboard control program 55 in which the key function switching program is included.

A program to be executed by the CPU 53, and data are loaded in the RAM 56.

When the timer 57 is set, it decrements a preset value. And when the count value reaches "0," the timer 17 outputs a time-out.

The interface circuit 58 compares data that are exchanged by the keyboard controller 52 and a computer 60 connected to each other via an I/O port 59.

Figure 6:
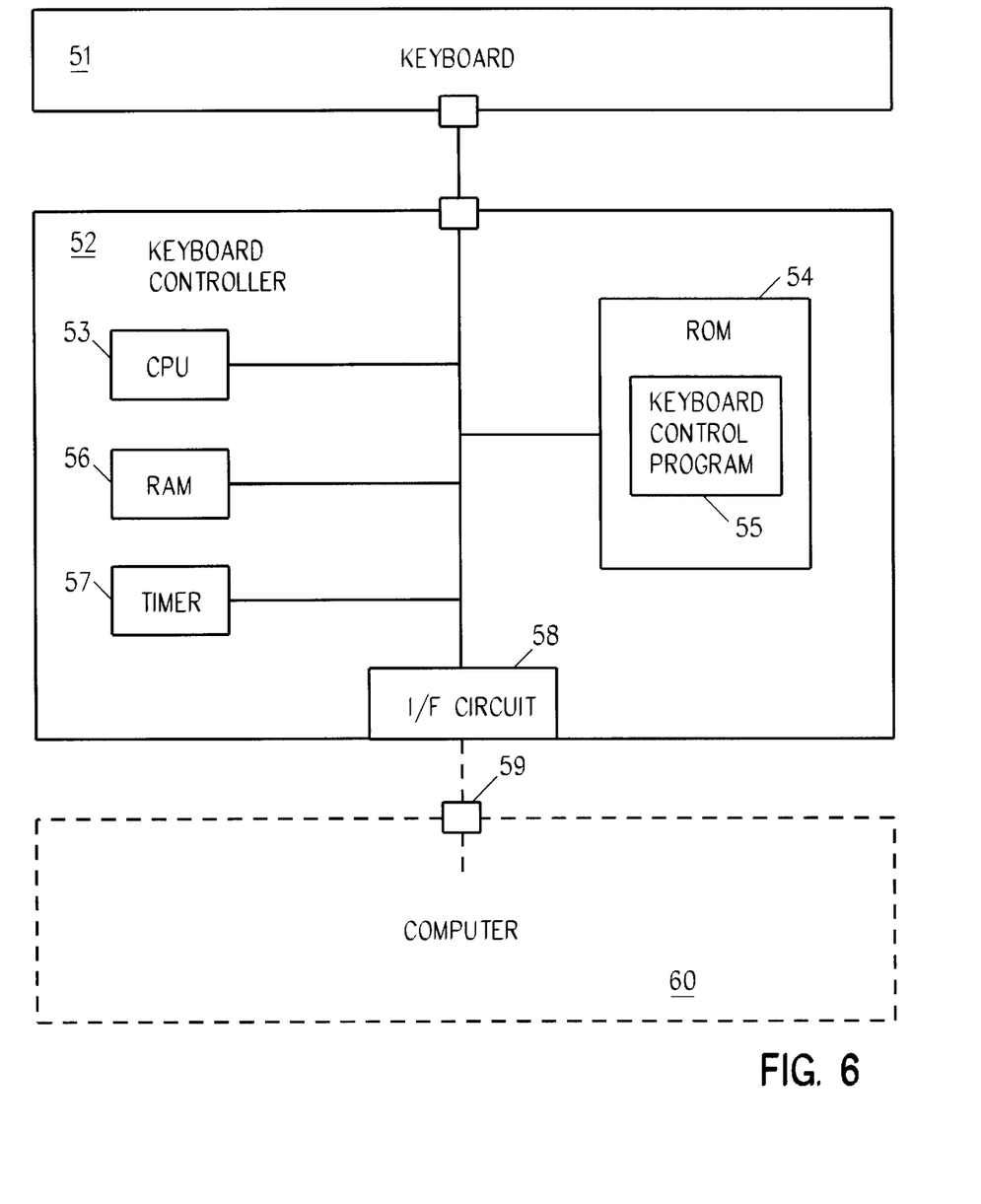
FIG. 6 is a diagram showing a keyboard controller in which is mounted a recording medium recording a key function switching program according to this embodiment.

In FIG. 6 the keyboard controller 52 is constituted by a plurality of components, including the CPU 53. However, the keyboard controller 52 can be designed as a single integrated circuit device. Further, for a computer, such as a ThinkPad (trademark), a notebook PC, including a one-chip multi-functional micro controller that functions as multiple controllers, such as a keyboard and auxiliary device controller and a battery controller, the keyboard controller 52 can be integrated in the one-chip micro controller. In this case, the H8 chip, which is produced by Hitachi Ltd., may be used as the one-chip controller.

Figure 7:
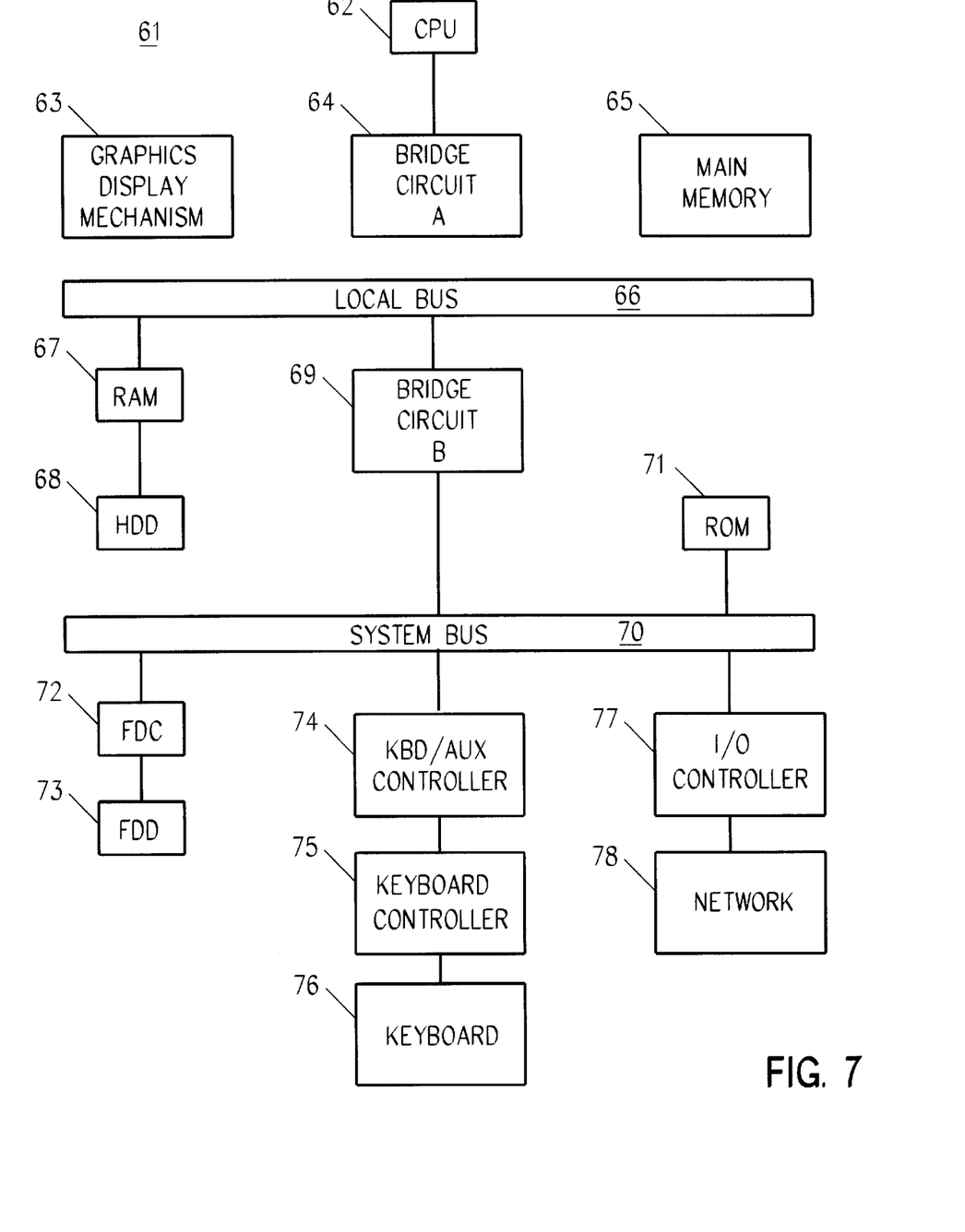
FIG. 7 is a diagram showing a computer that uses a method according to this embodiment for switching a plurality of key functions allocated to a special key.

While referring to FIG. 7, an explanation will now be given for a computer which uses the method described in this embodiment for switching multiple key functions allocated to a special key.

A computer 61 essentially comprises: a CPU 62, a graphics display mechanism 63, a bridge circuit A 64, a main memory 65, a local bus 66, a hard disk drive controller HDC 67, a hard disk drive HDD 68, a bridge circuit B 69, a system bus 70, a ROM (Read Only Memory) 71, a floppy disk drive controller FDC 72, a floppy disk drive FDD 73, a keyboard/auxiliary device controller (KBD/AUX controller) 74, a keyboard controller 75, a keyboard 76, an I/O (Input/Output) controller 77, and a network 78.

The local bus 66 is used for the connection of peripheral devices, such as the hard disk drive HDD 68, that are operated at a high speed, and is, for example, a PCI (Peripheral Component Interconnect) bus. The PCI bus has a local bus architecture that is determined by the PCI special interest group (the standardization group of which a hundred some odd companies, such as Intel Corp., IBM Corp. and Compaq Corp., are members).

The system bus 70 is used for the connection of peripheral devices, such as the floppy disk drive FDD 73 and the keyboard 76, that are operated at a low speed, and is, for example, an ISA (Industry Standard Architecture) bus. The ISA bus is an expansion bus that has been established as an international standard based on an expansion bus adopted for the PC/AT personal computers of IBM Corp.

The CPU 62 is connected to the main memory 65 and to the local bus 67 by the bridge circuit A 64. The bridge circuit A 64 is constituted by, for example, a memory/PCI control chip set.

The graphics display mechanism 63 controls the output to a display device, such as a CRT (Cathode Ray Tube) or an LCD (Liquid Crystal Display). The graphics display mechanism 63 and the bridge circuit A 64 are connected by, for example, an AGP (Accelerated Graphics Port) bus. The AGP bus is an improved, dedicated PCI bus for the connection of a circuit, such as a graphics card, associated with an image display.

The local bus 66, which is connected to the system bus 71 by the bridge circuit B 70, is constituted by, for example, a PCI-ISA bridge chip.

The hard disk drive HDD 68 is used to store various programs, including the operating system (OS). A system program, such as the OS, and application programs can be stored in another storage device, such as the ROM 71.

Generally, the keyboard controller 75 and the keyboard 76 are integrally formed as a keyboard unit, and the keyboard unit is connected to the system bus 70 via the keyboard/auxiliary device controller (KBD/AUX controller) 74.

The operation of the computer 61 in FIG. 7 will now be described. The key function switching program in this embodiment is stored in a computer readable recording medium. The recording medium can be a storage device mounted in a computer system, such as ROM (Read Only Memory), a EEPROM (Electrically Erasable Programmable Read Only Memory) or a flash EEPROM; a portable recording medium, such as a floppy disk (FD), a CD-ROM (a read only memory using a compact disk), or an MO (magneto-optical) disk; or a filing device provided for a server computer connected to a network.

The key function switching program stored on the recording medium is fetched to the computer 61 in the following manner. When the recording medium is a storage device mounted in the computer 61, two methods are used to fetch the key function switching program. If the recording medium is a read only memory, such as a ROM, the key function switching program is written in the ROM during the semiconductor fabrication process, and the ROM is mounted in the computer 61. For example, a keyboard control program written in the ROM (not shown) for the keyboard controller 74 in FIG. 7.

When the recording medium is an electrically erasable and read only memory (hereinafter referred to as a PROM), such as the EEPROM or the flash EEPROM, the key function switching program in this embodiment is stored in the PROM by overwriting a keyboard control program that was previously stored in the PROM.

When the recording medium is a filing device on a network 78, the key function switching program in this embodiment is downloaded from the filing device across the I/O control 77, and is temporarily stored on the HDD 68. Then, the key function switching program on the HDD 68 is written to the PROM by overwriting the keyboard control program in the same manner as is described above.

According to the method of the present invention for switching among a plurality of key functions allocated to a special key provided on a keyboard, the occurrence of a phenomenon that is contrary to a user's intent can be prevented.

The invention has been described with specific reference to one embodiment of the invention. As will be apparent to one having skill in the relevant art, modifications can be made without departing from the spirit and scope of the invention as set forth in the appended claims.

Having thus described the invention, what is claimed is:

1. A method for switching among a plurality of key functions allocated to a special key, said special key being provided on a keyboard and carrying out a predetermined key function in combination with another key, said method comprising the steps of:

detecting a depression of said special key;

asserting, in accordance with the detection of the depression, a request to output a make scan code being output in response to an independent depression of said special key, said make scan code being originally allocated to said special key; and outputting, if said assertion of the request is kept when said special key is released, said make scan code being output in response to an independent depression of said special key, said make scan code being originally allocated to said special key.

2. The method for switching of claim 1 wherein said asserting comprises setting a register for asserting a request to output a make scan code among a plurality of key functions allocated to a special key and wherein said outputting is conducted if said register is set when said special key is released.

3. The method for switching of claim 2 further comprising starting a timer in accordance with the detection of the depression and wherein said outputting is done if said register is set when said timer has reached a preset time.

4. The method for switching of claim 2 wherein said keyboard also comprises a hotkey, said method further comprising executing a hotkey function if said hotkey is depressed after said special key has been depressed and wherein said outputting comprises, if said register is set when a key other than said hotkey is depressed, outputting said make scan code followed by a second make scan code of said key other than said hotkey; and, if said register is not set, outputting said second make scan code of said key other than said hotkey.

5. A computer-readable recording medium storing a program used for switching among a plurality of key functions allocated to a special key, said special key being provided on a keyboard and carrying out a predetermined key function in combination with another key, said program comprising the steps of:

detecting a depression of said special key;

asserting, in accordance with the detection of the depression, a request to output a make scan code being output in response to an independent depression of said special key, said make scan code being originally allocated to said special key; and outputting, if said assertion of the request is kept when said special key is released, said make scan code being output in response to an independent depression of said special key, said make scan code being originally allocated to said special key.

6. The computer-readable recording medium for performing said method in accordance with claim 5 wherein said asserting comprises setting a register for asserting a request and wherein said outputting is conducted if said register is set when said special key is released.

7. The computer-readable recording medium for performing said method in accordance with claim 6 wherein said method further comprises starting a timer in accordance with the detection of the depression and wherein said outputting is conducted if said register is set when said timer has reached a preset time.

8. The computer-readable recording medium for performing said method in accordance with claim 6 wherein said keyboard also comprises a hotkey and wherein said method further comprises executing a hotkey function if said hotkey is depressed after said special key has been depressed and wherein said outputting comprises, if said register is set when a key other than said hotkey is depressed, outputting said make scan code followed by a second make scan code of said key other than said hotkey; and, if said register is not set, outputting said second make scan code of said key other than said hotkey.

9. A keyboard controller for processing input to a computer keyboard comprising:

a processing component;

a read only memory;

a random access memory; and a bus connecting said processing component, said read only memory and said random access memory, and wherein said read only memory comprises a computer-readable recording medium storing a program used for switching among a plurality of key functions allocated to a special key, said special key being provided on a keyboard and carrying out a predetermined key function in combination with another key, said program comprising the steps of:

detecting a depression of said special key;

asserting, in accordance with the detection of the depression, a request to output a make scan code being output in response to an independent depression of said special key, said make scan code being originally allocated to said special key; and outputting, if said assertion of the request is kept when said special key is released, said make scan code being output in response to an independent depression of said special key, said make scan code being originally allocated to said special key.

10. The keyboard controller of claim 9 wherein said asserting comprises setting a register for asserting a request to output a make scan code among a plurality of key functions allocated to a special key and wherein said outputting is conducted if said register is set when said special key is released.

11. The keyboard controller of claim 10 wherein said method further comprises starting a timer in accordance with the detection of the depression and wherein said outputting is done if said register is set when said timer has reached a preset time.

12. The keyboard controller of claim 10 wherein said keyboard further comprises a hotkey and wherein said method further comprises executing a hotkey function if said hotkey is depressed after said special key has been depressed and wherein said outputting comprises, if said register is set when a key other than said hotkey is depressed, outputting said make scan code followed by a second make scan code of said key other than said hotkey; and, if said register is not set, outputting said second make scan code of said key other than said hotkey.

13. A computer comprising:

a processing component;

a read only memory;

an external storage device;

a keyboard;

a keyboard controller; and at least one bus connecting said processing component, said read only memory, said external storage device and said keyboard controller, and wherein said keyboard controller comprises a keyboard processing component, a keyboard random access memory, and a keyboard read only memory comprising a computer-readable recording medium storing a program used for switching among a plurality of key functions allocated to a special key, said special key being provided on a keyboard and carrying out a predetermined key function in combination with another key, said program comprising the steps of:

detecting a depression of said special key;

asserting, in accordance with the detection of the depression, a request to output a make scan code being output in response to an independent depression of said special key, said make scan code being originally allocated to said special key; and outputting, if said assertion of the request is kept when said special key is released, said make scan code being output in response to an independent depression of said special key, said make scan code being originally allocated to said special key.

14. The computer of claim 13 wherein said asserting comprises setting a register for asserting a request to output a make scan code among a plurality of key functions allocated to a special key and wherein said outputting is conducted if said register is set when said special key is released.

15. The computer of claim 14 further comprising a timer and wherein said method further comprises starting a timer in accordance with the detection of the depression and wherein said outputting is done if said register is set when said timer has reached a preset time.

16. The computer of claim 14 wherein said keyboard also comprises a hotkey, said method further comprising executing a hotkey function if said hotkey is depressed after said special key has been depressed and wherein said outputting comprises, if said register is set when a key other than said hotkey is depressed, outputting said make scan code followed by a second make scan code of said key other than said hotkey; and, if said register is not set, outputting said second make scan code of said key other than said hotkey.

* * * * *